(12) United States Patent
Wang et al.

(10) Patent No.: US 11,954,832 B2
(45) Date of Patent: Apr. 9, 2024

(54) THREE-DIMENSIONAL RECONSTRUCTION METHOD AND APPARATUS

(71) Applicant: BEIJING AINFINIT TECHNOLOGY CO., LTD, Beijing (CN)

(72) Inventors: Song Wang, Beijing (CN); Feng Zhang, Beijing (CN); Xinran Yu, Beijing (CN)

(73) Assignee: BEIJING AINFINIT TECHNOLOGY CO., LTD, Beijing (CN)

( * ) Notice: Subject to any disclaimer, the term of this patent is extended or adjusted under 35 U.S.C. 154(b) by 534 days.

(21) Appl. No.: 17/250,707

(22) PCT Filed: Mar. 26, 2019

(86) PCT No.: PCT/CN2019/079686
§ 371 (c)(1),
(2) Date: Feb. 22, 2021

(87) PCT Pub. No.: WO2020/151078
PCT Pub. Date: Jul. 30, 2020

(65) Prior Publication Data
US 2021/0192704 A1    Jun. 24, 2021

(30) Foreign Application Priority Data

Jan. 25, 2019  (CN) .......................... 201910074343.5

(51) Int. Cl.
*G06T 5/50*  (2006.01)
*G06T 7/55*  (2017.01)
*G06T 17/00*  (2006.01)

(52) U.S. Cl.
CPC .................. *G06T 5/50* (2013.01); *G06T 7/55* (2017.01); *G06T 17/00* (2013.01)

(58) Field of Classification Search
CPC .... G06T 5/50; G06T 7/55; G06T 7/50; G06T 17/00; G06T 7/136; G06T 2207/20221
See application file for complete search history.

(56) References Cited

U.S. PATENT DOCUMENTS 6,476,812 B1  11/2002  Yoshigahara et al.
6,847,371 B2 *  1/2005  Matsumoto ............. G06T 15/04
                                                 345/582

(Continued)

FOREIGN PATENT DOCUMENTS

CN      105979203 A    9/2016
CN      107170037 A    9/2017

(Continued)

OTHER PUBLICATIONS

Machine translation of KR100748719B1 (Year: 2007).*

(Continued)

*Primary Examiner* — Aaron W Carter
*Assistant Examiner* — Courtney Joan Nelson
(74) *Attorney, Agent, or Firm* — MASCHOFF BRENNAN (57) ABSTRACT

A method and an apparatus for three-dimensional reconstruction. Images of the reconstruction space captured by N cameras are acquired as N current images in response to an object entering the reconstruction space. Foreground-background differences of all position points in the N current images are obtained according to the N current images and N corresponding initial background images captured by the N cameras when the reconstruction space is empty. Corresponding foreground-background differences of position points in the N current images are fused according to a corresponding relationship between all position points in the N current images and all position points in the reconstruction space, to obtain a foreground-background difference of each position point in the reconstruction space. All position (Continued)

points in the reconstruction space are filtered based on the foreground-background difference of each position point in the reconstruction space and the preset foreground-background threshold, to reconstruct the object three-dimensionally.

13 Claims, 4 Drawing Sheets

(56) References Cited

U.S. PATENT DOCUMENTS

| | | | | |
|---|---|---|---|---|
| 10,157,327 | B2* | 12/2018 | Kuzuya | G06V 40/161 |
| 2011/0191070 | A1 | 8/2011 | Ramalingam | |
| 2017/0302901 | A1* | 10/2017 | Yang | H04N 13/00 |
| 2018/0218485 | A1* | 8/2018 | Xi | G06T 17/00 |

FOREIGN PATENT DOCUMENTS

| | | | |
|---|---|---|---|
| CN | 108694741 A | | 10/2018 |
| JP | 2000172878 A | | 6/2000 |
| JP | 2000324509 A | | 11/2000 |
| JP | 2007180932 A | | 7/2007 |
| JP | 2007180932 A | * | 7/2007 |
| JP | 2014164525 A | * | 9/2014 |
| JP | 2014164525 A | | 9/2014 |
| JP | 2018205788 A | * | 12/2018 |
| JP | 2018205788 A | | 12/2018 |
| KR | 100748719 B1 | * | 1/2007 |
| WO | 2016021411 A1 | | 2/2016 |

OTHER PUBLICATIONS

Machine translation of JP-2007180932-A (Year: 2007).*
Machine translation of JP-2018205788-A (Year: 2018).*
Machine translation of JP-2014164525-A (Year: 2014).*
Japanese Office Action for Japanese Patent Application No. 2021-540143 dated Feb. 14, 2023.
International Search Report dated Oct. 9, 2019, in related PCT Application No. PCT/CN2019/079686.
Japanese Office Action for Japanese Patent Application No. 2021-540143 dated Aug. 17, 2022.

* cited by examiner

THREE-DIMENSIONAL RECONSTRUCTION METHOD AND APPARATUS

The present application is the national phase of International Application No. PCT/CN2019/079686, titled "METHOD AND APPARATUS FOR THREE-DIMENSIONAL RECONSTRUCTION", filed on Mar. 26, 2019, which claims the priority to Chinese Patent Application No.201910074343.5, titled "METHOD AND APPARATUS FOR THREE-DIMENSIONAL RECONSTRUCTION", filed on Jan. 25, 2019 with the China National Intellectual Property Administration, which is incorporated herein by reference in its entirety.

FIELD

The present disclosure relates to the technical field of image analysis and image processing, and in particular to a method and an apparatus for three-dimensional reconstruction.

BACKGROUND

With rapid development of science and technology, three-dimensional (3D) reconstruction techniques are applied to more and more scenes, such that mathematical models facilitating computer representation and processing are established for objects. The 3D reconstruction is a key technique for building virtual reality that represents the objective world in a cyber space. Currently, the 3D reconstruction techniques mainly include direct 3D reconstruction techniques and indirect 3D reconstruction techniques.

In the direct 3D reconstruction techniques, a 3D shape and a 3D structure of an object are practically measured by special measuring equipment with a function of laser ranging. In the indirect 3D reconstruction techniques, images of an object are captured from different angles, feature points of the images are extracted from the images, and a 3D shape and a 3D structure of the object are generated by comparing and matching the feature points.

The direct 3D reconstruction techniques take a lot of time to perform a comprehensive laser ranging on the object, and the indirect 3D reconstruction techniques requires a large amount of complicated calculation when comparing the feature points in the object images captured under different angles. That is, both 3D reconstruction techniques require several minutes or even hours to complete 3D reconstruction. Therefore, both 3D reconstruction techniques are not suitable for scenes that require real-time 3D reconstruction, such as scenes in which human movements or object motion are captured.

SUMMARY

A technical issue addressed by the present disclosure is to provide a method and an apparatus for three-dimensional reconstruction. The method and the apparatus can implement, quickly and in real time, three-dimensional reconstruction of an object entering a reconstruction space, and are suitable for scenarios that require real-time three-dimensional reconstruction.

In a first aspect, a method for three-dimensional reconstruction is provided according to embodiments of the present disclosure, including:
acquiring images of a reconstruction space captured by N cameras as N current images, in response to an object entering the reconstruction space, where N is a positive integer greater than or equal to 2, and the reconstruction space is covered by fields of view of the N cameras;
obtaining foreground-background differences of all position points in the N current images, according to the N current images and N initial background images of the reconstruction space, where the N initial background images correspond to the N current images, and are captured by the N cameras when the reconstruction space is empty;
fusing corresponding ones of the foreground-background differences of all position points in the N current images, according to a corresponding relationship between all position points in the N current images and all position points in the reconstruction space, to obtain a foreground-background difference of each position point in the reconstruction space, and
filtering all position points in the reconstruction space, based on the foreground-background difference of each position point in the reconstruction space and a preset foreground-background threshold, to reconstruct the object three-dimensionally.

In an optional embodiment, the corresponding relationship between all position points in the N current images and all position points in the reconstruction space is determined by position information of the N cameras and angle information of the N cameras, where the N cameras are fixedly disposed at an edge of the reconstruction space.

In an optional embodiment, obtaining the foreground-background differences of all position points in the N current images, according to the N current images and the N initial background images, includes:
obtaining pixel values of all position points in the N current images and pixel values of all position points in the N initial background images, and
obtaining the foreground-background differences of all position points in the N current images, according to the pixel values of all position points in the N current images, the pixel values of all position points in the corresponding N initial background images, and a difference function.

In an optional embodiment, the difference function is determined based on a Gaussian mixture model, or based on a vector distance equation.

In an optional embodiment, the vector distance equation includes a Euclidean distance equation, a Manhattan distance equation, or a cosine distance equation.

In an optional embodiment, fusing corresponding ones of the foreground-background differences of all position points in the N current images, according to the corresponding relationship between all position points in the N current images and all position points in the reconstruction space, to obtain the foreground-background difference of each position point in the reconstruction space, comprises:
determining foreground-background differences of position points, which correspond to each position point in the reconstruction space, in the N current images according to the corresponding relationship between all position points in the N current images and all position points in the reconstruction space; and
obtaining the foreground-background difference of each position point in the reconstruction space, according to the foreground-background differences of the position points, which correspond to each position point in the reconstruction space, in the N current images and a fusing function.

In an optional embodiment, the fusing function includes an adding function or a multiplying function.

In an optional embodiment, a boundary surface of the reconstruction space has a texture of alternating colors.

In an optional embodiment, the method further includes: acquiring images captured by the N cameras for the reconstruction space to update the N initial background images, in response to illumination being changed when the reconstruction space is empty.

In a second aspect, an apparatus for three-dimensional reconstruction is provided according to embodiments of the present disclosure, including:

an acquiring unit, configured to acquire images of a reconstruction space captured by N cameras as N current images, in response to an object entering the reconstruction space, where N is a positive integer greater than or equal to 2, and the reconstruction space is covered by fields of view of the N cameras;

a first obtaining unit, configured to obtain foreground-background differences of all position points in the N current images, according to the N current images and N initial background images of the reconstruction space, where the N initial background images correspond to the N current images, and are captured by the N cameras when the reconstruction space is empty;

a second obtaining unit, configured to fuse corresponding ones of the foreground-background differences of all position points in the N current images, according to a corresponding relationship between all position points in the N current images and all position points in the reconstruction space, to obtain a foreground-background difference of each position point in the reconstruction space, and a reconstructing unit, configured to filter all position points in the reconstruction space, based on the foreground-background difference of each position point in the reconstruction space and a preset foreground-background threshold, to reconstruct the object three-dimensionally.

In a third aspect, a terminal device is provided according to embodiments of the present disclosure, comprising a processor and a memory, where:

the memory is configured to store program codes and transmit the program codes to the processor, and the processor is configured to execute any method for three-dimensional reconstruction in the foregoing first aspect, according to instructions in the program codes.

In a fourth aspect, a computer-readable storage medium is provided according to embodiments of the present disclosure, where the computer-readable storage medium is configured to store program codes, and the program codes are configured to execute any method for three-dimensional reconstruction in the foregoing first aspect.

Embodiments of the present disclosure achieve at least following advantages in comparison with conventional technology.

Technical solutions are provided according to embodiments of the present disclosure. First, the images of the reconstruction space captured by the N cameras, whose fields of view cover the reconstruction space, are acquired as the N current images in response to the object entering the reconstruction space. Then, the foreground-background differences of all position points in the N current images are obtained according to the N current images and the N corresponding initial background images, which are of the reconstruction space and captured by the N cameras when the reconstruction space is empty. Afterwards, the corresponding ones of the foreground-background differences of all position points in the N current images are fused according to the corresponding relationship between all position points in the N current images and all position points in the reconstruction space, to obtain the foreground-background difference of each position point in the reconstruction space. Finally, all position points in the reconstruction space are filtered based on the foreground-background difference of each position point in the reconstruction space and the preset foreground-background threshold, to reconstruct the object three-dimensionally. Hence, in response to the object entering the reconstruction space, a foreground is separated from a background based on the N current images and the N corresponding initial background images, so as to reconstruct the object three-dimensionally. Calculations for separating the foreground from the background are simple and convenient, and thereby three-dimensional reconstruction of the object entering the reconstruction space can be implemented quickly and in real time. The method is quite suitable for scenarios that require real-time three-dimensional reconstruction.

BRIEF DESCRIPTION OF THE DRAWINGS

For clearer illustration of the technical solutions according to embodiments of the present disclosure or conventional techniques, hereinafter briefly described are the drawings to be applied in embodiments of the present disclosure or conventional techniques. Apparently, the drawings in the following descriptions are only some embodiments of the present disclosure, and other drawings may be obtained by those skilled in the art based on the provided drawings without creative efforts.

DETAILED DESCRIPTION OF EMBODIMENTS

In order to help those skilled in the art better understand solutions of the present disclosure, hereinafter technical solutions in embodiments of the present disclosure are described clearly and completely in conjunction with the drawings in embodiments of the present closure. Apparently, the described embodiments are only some rather than all of the embodiments of the present disclosure. Any other embodiments obtained based on the embodiments of the present disclosure by those skilled in the art without any creative effort fall within the scope of protection of the present disclosure.

Currently, 3D reconstruction techniques mainly include direct 3D reconstruction techniques and indirect 3D reconstruction techniques. In the direct 3D reconstruction techniques, a 3D shape and a 3D structure of an object are practically measured by special measuring equipment with a function of laser ranging. In the indirect 3D reconstruction techniques, images of an object are captured from different angles, feature points of the images are extracted from the images, and a 3D shape and a 3D structure of the object are generated by comparing and matching the feature points. The direct 3D reconstruction techniques take a lot of time to perform a comprehensive laser ranging on the object, and the indirect 3D reconstruction techniques requires a large amount of complicated calculation when comparing the feature points in the object images captured under different angles. That is, both 3D reconstruction techniques require several minutes or even hours to complete 3D reconstruction, and are not suitable for scenes that require real-time 3D reconstruction. For example, some scenarios require capturing human movements in real time, such as a smart vending machine detecting an action of a customer who fetches commodity, or a production equipment detecting whether an operation of a worker complies with safety regulations. For another example, some scenarios require capturing object motion in real time, such as detecting transportation of spare parts on a factory production line.

Embodiments of the present disclosure aim to address the above issue. First, images of a reconstruction space captured by N cameras, whose fields of view cover the reconstruction space, are acquired as N current images in response to an object entering the reconstruction space. Then, foreground-background differences of all position points in the N current images are obtained according to the N current images and N corresponding initial background images, which are of the reconstruction space and captured by the N cameras when the reconstruction space is empty. Afterwards, corresponding ones of the foreground-background differences of all position points in the N current images are fused according to a corresponding relationship between all position points in the N current images and all position points in the reconstruction space, to obtain a foreground-background difference of each position point in the reconstruction space. Finally, all position points in the reconstruction space are filtered based on the foreground-background difference of each position point in the reconstruction space and a preset foreground-background threshold, to reconstruct the object three-dimensionally. Hence, in response to the object entering the reconstruction space, a foreground is separated from a background based on the N current images and the N corresponding initial background images, so as to reconstruct the object three-dimensionally. Calculations for separating the foreground from the background are simple and convenient, and thereby three-dimensional reconstruction of the object entering the reconstruction space can be implemented quickly and in real time. The method is quite suitable for scenarios that require real-time three-dimensional reconstruction.

Figure 1:
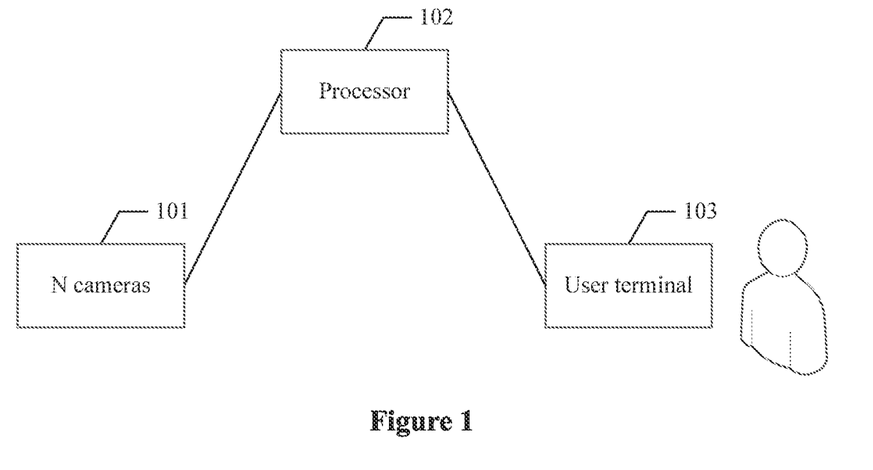
FIG. 1 is a schematic diagram of a system framework related to an application scenario according to an embodiment of the present disclosure.

For example, a scenario in embodiments of the present disclosure may be as shown in FIG. 1. The scenario includes N cameras 101, a processor 102, and a user terminal 103. N is a positive integer greater than or equal to 2, and fields of view of the cameras cover the reconstruction space.

In a case that the reconstruction space is empty, the N cameras 101 capture images of the reconstruction space, and send the images to the processor 102. The processor 102 determines the images as N initial background images. In response to an object entering the reconstruction space, the N cameras 101 capture images of the reconstruction space, and send the images to the processor 10. The processor 102 determines the images as N current images. The processor 102 obtains a foreground-background difference of each position point in the N current images according to the N current images and N initial background images that correspond to the N current images. The processor 102 fuses corresponding ones of the foreground-background differences of all position point in the N current images, according to a corresponding relationship between all position points in the N current images and all position points in the reconstruction space, to obtain a foreground-background difference of each position point in the reconstruction space. The processor 102 filters all position points in the reconstruction space, based on the foreground-background difference of each position point in the reconstruction space and a preset foreground-background threshold, to reconstruct the object three-dimensionally. The processor 102 obtains a three-dimensional reconstruction image of the object, and sends the three-dimensional reconstruction image to the user terminal 103. The user terminal 103 displays the three-dimensional reconstruction image of the object to a user.

Although the steps are executed by the processor 102 in description of this scenario, an execution subject is not limited thereto in embodiments of the present disclosure, as long as it can execute steps disclosed in embodiments of the present disclosure.

This scenario is only an example of scenarios in embodiments of the present disclosure, and embodiments of the present application are not limited to this scenario.

Hereinafter embodiments of a method and an apparatus for three-dimensional reconstruction are illustrated in detail in conjunction with the accompanying drawings.

Method Embodiment

Figure 2:
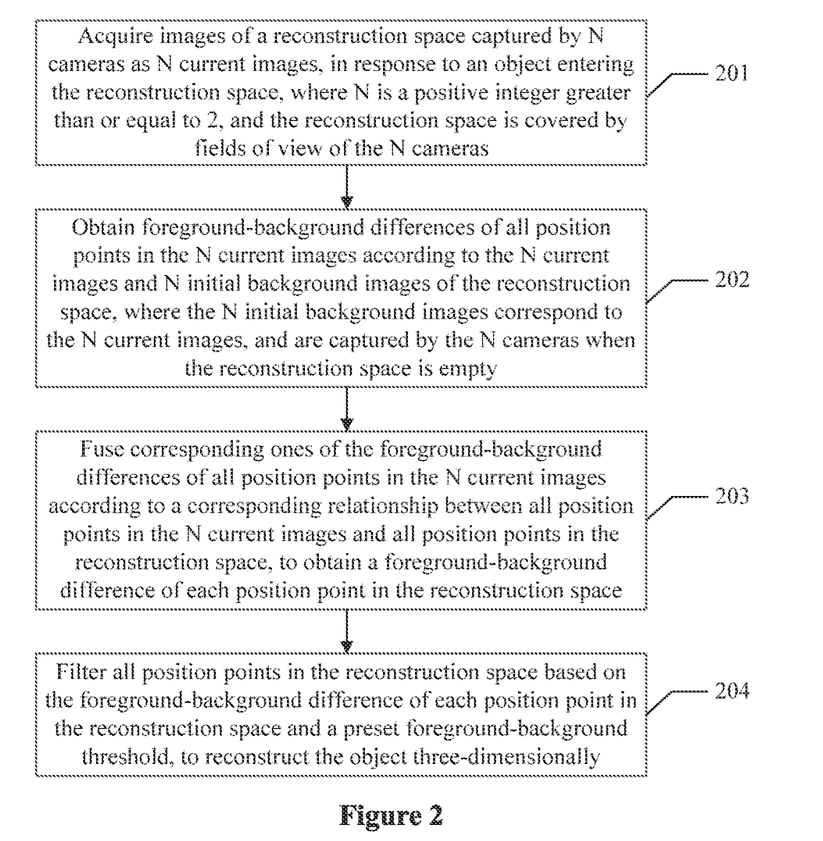
FIG. 2 is a flow chart of a method for three-dimensional reconstruction according to an embodiment of the present disclosure.

Reference is made to FIG. 2, which is a flow chart of a method for three-dimensional reconstruction according to an embodiment of the present disclosure. In this embodiment, the method for three-dimensional reconstruction may include following steps S201 to S204.

In step 201, images of a reconstruction space captured by N cameras are acquired as N current images, in response to an object entering the reconstruction space. N is a positive integer greater than or equal to 2, and the reconstruction space is covered by fields of view of the N cameras.

The reconstruction space refers to a space in which three-dimensional reconstruction of the entering object is performed. In embodiments of the present disclosure, the reconstruction space may be a cube, a cylinder, or a sphere, but is not limited to these cases. In one embodiment, a base requirement is that the cameras are disposed at an edge of the reconstruction space. It is assumed that N cameras are disposed, and N is a positive integer greater than or equal to 2. The N cameras are required to be dispersedly disposed at edges of the reconstruction space, a lens of each camera faces interior of the reconstruction space, and the fields of view of the N cameras cover the entire reconstruction space. No other limitation is put on a quantity of the cameras and locations of the cameras in embodiments of the present disclosure. The quantity of cameras does not affect or change operation and calculation in subsequent steps. The more cameras are arranged, the more data may be used in subsequent steps, and the more accurate the three-dimensional reconstruction is. All the cameras should be fixed after disposal, in order to ensure that no camera moves or rotates when being used.

Figure 3:
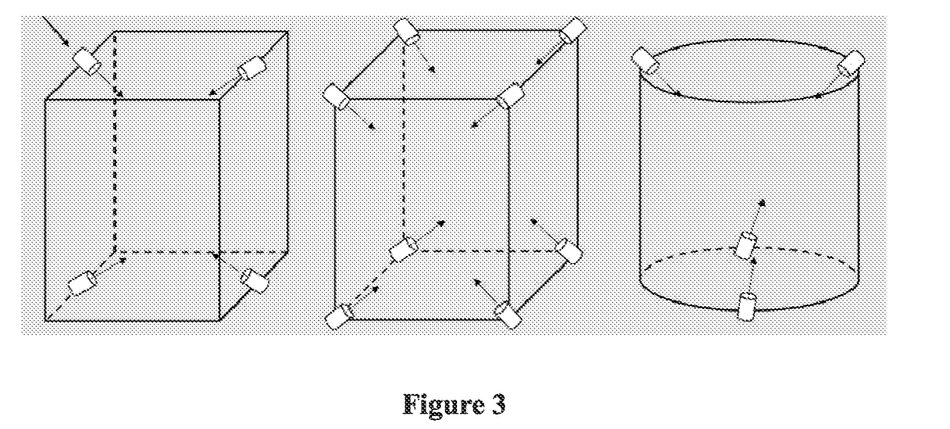
FIG. 3 is schematic structural diagrams of a reconstruction space and N cameras according to an embodiment of the present disclosure.

As an example, FIG. 3 shows schematic structural diagrams of the reconstruction space and the N cameras. In a case that the reconstruction space is a cube, four cameras may be arranged at midpoints of four edges of the cube, and N is equal to 4. Alternatively, eight cameras may be arranged at eight vertices of the cube, and N is equal to 8. In a case that the reconstruction space is a cylinder, four cameras may be crossly arranged on top and bottom surfaces of the cylinder, and N is equal to 4.

In a case that an object enters the reconstruction space, it indicates that the object needs to be three-dimensionally reconstructed in the reconstruction space. In such case, N cameras capture N images of the reconstruction space, and a processor acquires the N images as the N current images. Each of the N current images includes an image of a part of the object, which serves as a foreground image. The remaining portion of such current image serves as a background image.

In step 202, foreground-background differences of all position points in the N current images are obtained according to the N current images and N initial background images of the reconstruction space. The N initial background images correspond to the N current images, and are captured by the N cameras when the reconstruction space is empty.

The N initial background images are obtained in a following manner. After the N cameras are fixedly disposed, the N cameras are triggered to capture N images of the reconstruction space when the reconstruction space is empty, and the processor acquires the N images as the N initial background images. When obtaining the initial background images, it is necessary to ensure that no object enters the reconstruction space. The N initial background images are stored in the processor. Each initial background image does not include an image of any part of the object entering the reconstruction space, and only includes a background image of pure reconstruction space.

Since each of the N initial background images does not include an image of any part of the object entering the reconstruction space, that is, all parts of each initial background image belong to the background image. Since each camera is fixed, there is a one-to-one correspondence between all position points of the current image and all position points of the corresponding initial background image. The foreground-background difference of each position point in the current image may be obtained by comparing the current image with the corresponding initial background image. Thereby, the foreground image can be separated from the current image, and can be applied in subsequent steps in three-dimensional reconstruction of the object.

For any position point located in both a current image and the corresponding initial background image, the foreground-background difference of such position point in the current image may be represented by a difference between a pixel value of such position point in the current image and a pixel value of such position point in the corresponding initial background image. After the pixel value of each position point in the current image and the pixel value of such position point in the corresponding initial background image are determined, the difference between the pixel values can be obtained as the foreground-background difference through a predefined difference function. The larger the foreground-background difference is, the greater a probability that such corresponding position point belongs to the foreground image is. The smaller the foreground-background difference is, the greater a probability that the corresponding position point belongs to the background image is. Therefore, in some embodiments of the present disclosure, the step 202 may include the following steps A and B as an example.

In step A, pixel values of all position points in the N current images and pixel values of all position points in the N initial background images are obtained.

In step B, the foreground-background differences of all position points in the N current images are obtained according to the pixel values of all position points in the N current images, the pixel values of all position points in the corresponding N initial background images, and a difference function.

For example, (u,v) represents a position point located in both the current image and the corresponding initial background image. $(R_C, G_C, B_C)$ represents the pixel value of the position point in the current image. $(R_B, G_B, B_B)$ represents the pixel value of the position point in the corresponding initial background image. F represents the predefined difference function. In such case, the foreground-background difference Diff of the position point in the current image is Diff=$F(R_B, G_B, B_B, R_C, G_C, B_C)$. In a case that the position point in the current image does not belong to the foreground image but belongs to the background image, then there is $(R_C, G_C, B_C) = (R_B, G_B, B_B)$, and the foreground-background difference Diff of the position point in the current image is equal to 0.

The predefined difference function may be configured in various forms. In the embodiments of the present disclosure, there may be two manners of constructing the difference function. A first manner is a classic manner, in which the difference function may be determined based on a Gaussian mixture model. A second manner is taking the pixel value as a three-dimensional vector, and the difference function may be determined based on a classic vector distance equation. Frequently used are Euclidean distance equations, Manhattan distance equations, cosine distance equations, and the like, any of which may be selected to determine the difference function. In some embodiments of the present application, the difference function is determined based on the mixed Gaussian model. Alternatively, the difference function is determined based on the vector distance equation, which includes a Euclidean distance equation, a Manhattan distance equation or a cosine distance equation.

For example, in a case that the difference function is determined based on the Euclidean distance equation, the foreground-background difference Diff of each position point in the current image is Diff=$\sqrt{(R_B - R_C)^2 + (G_B - G_C)_2 + (B_B - B_C)^2}$. In a case that the difference function is determined based on the Manhattan distance equation, the foreground-background difference Diff of each position point in the current image is Diff=$|R_B - R_C| + |G_B - G_C| + |B_B - B_C|$. In a case that the difference function is determined based on the cosine distance equation, the foreground-background difference Diff of each position point in the current image is $$Diff = \frac{R_B R_C + G_B G_G + B_B B_C}{\sqrt{R_B^2 + G_B^2 + B_B^2} + \sqrt{R_C^2 + G_C^2 + B_C^2}}.$$

In step 203, corresponding ones of the foreground-background differences of all position points in the N current images are fused according to a corresponding relationship between all position points in the N current images and all position points in the reconstruction space, to obtain a foreground-background difference of each position point in the reconstruction space.

In the step 202, the foreground-background differences of all position points in the N current images are acquired to indicate the probability that each position point in the N current images belongs to the foreground image. Afterwards, the foreground-background difference of each position point in the reconstruction space should be obtained to determine the probability that each position point in the reconstruction space belongs to the object. Each position point in the reconstruction space has corresponding position points in the N current images, and each corresponding position point in the current images is provided with the foreground-background difference indicating the probability that such corresponding position point belongs to the foreground image. Hence, a fusion function may be applied to fuse the foreground-background differences of the corresponding position points in the N current images, such that the foreground-background difference representing the probability that such position point in the reconstruction space belongs to the object can be obtained. In some embodiments of the present disclosure, the step 203 may include following steps C and D as an example.

In step C, foreground-background differences of position points, which correspond to each position point in the reconstruction space, in the N current images are determined according to the corresponding relationship between all position points in the N current images and all position points in the reconstruction space.

In step D, the foreground-background difference of each position point in the reconstruction space are obtained according to the foreground-background differences of the position points, which correspond to each position point in the reconstruction space, in the N current images and a fusing function.

For example, (x,y,z) represents a position point in the reconstruction space. $\text{Diff}_i$ represents the foreground-background difference of the position point in a current image that corresponds to such position point in the reconstruction space, where the current image is obtained by the processor from the $i^{th}$ camera, and i=1, 2, 3 ..., N. R represents a predefined fusion function. In such case, the foreground-background difference Diff3D of such position point in the reconstruction space is $\text{Diff3D}=R(\text{Diff}_1, \text{Diff}_2, \ldots, \text{Diff}_N)$.

The foreground-background differences of the position points in the N current images that correspond to each position point in the reconstruction space are obtained in a following manner. First, the position points in the N current images that correspond to each position point in the reconstruction space is determined based on the corresponding relationship between all position points in the N current images and all position points in the reconstruction space. Then, the foreground-background differences of the these position points are determined. Since the N current images are taken by the N cameras that are fixedly disposed at the edge of the reconstruction space, position information and angle information of the N cameras are constant. A principle of imaging by the camera is projecting different position points in the reconstruction space onto an imaging plane, so as to generate a captured image. Assuming that (x,y,z) represents a position point in the reconstruction space, a position point (u,v) that is located in the current image corresponding to the camera and corresponds to the position point (x,y,z) can be obtained based on the fixed position information and fixed angle information of such camera. In other words, the position information and the angle information of the camera are capable to determine the corresponding relationship between the position point (u,v) in current image and the position point (x,y,z) in the reconstruction space. Therefore, in some embodiments of the present disclosure, the corresponding relationship between all position points in the N current images and all position points in the reconstruction space is determined by position information and angle information of the N cameras that are fixedly disposed at an edge of the reconstruction space.

In imaging of a camera, all position points located on a light ray incident to such camera correspond to a same position point in an image captured by such camera. Thereby, all position points on a light ray incident to a camera correspond to the same position point in the corresponding current image. For example, the position points A and B are located on a same light ray incident to a camera, and the position points A and B correspond to a same position point in the current image corresponding to such camera. It is assumed that $(x_A, y_A, z_A)$ represents the position point A in the reconstruction space, $(x_B, y_B, z_B)$ represents the position point B in the reconstruction space, and the position point $(u_1, v_1)$ in the current image corresponding to such camera corresponds to both the position point A and the position point B in the reconstruction space.

Similar to the difference function, the predefined fusing function may be in various forms. Since the fusing function is configured to fuse the foreground-background differences of position points in the N current images that correspond to each position point in the reconstruction space, the foreground-background differences of the position points in the N current images may be fused by adding operation or multiplying operation. In embodiments of the present disclosure, the fusing function may be implemented as two types of functions. The first type is an adding function, and the second type is a multiplying function. Either of the above two types may be applied. Therefore, in embodiments of the present disclosure, the fusing function includes an adding function or a multiplying function.

Examples are illustrated as follows. In a case that the adding function serves as the fusing function R, the foreground-background difference Diff3D of each position point in the reconstruction space is $\text{Diff3D}=\sum_{i=1}^{N}\text{Diff}_i$. In a case that the multiplying function serves as the fusing function R, the foreground-background difference Diff3D of each position point in the reconstruction space is $\text{Diff3D}=\prod_{i=1}^{N}\text{Diff}_i$.

In step S204, all position points in the reconstruction space are filtered based on the foreground-background difference of each position point in the reconstruction space and a preset foreground-background threshold, to reconstruct the object three-dimensionally.

The foreground-background difference of each position point in the reconstruction space can indicate the probability that each position point belongs to the object. The larger the foreground-background difference of each position point in the reconstruction space is, the greater the probability that such position point belongs to the object is. Hence, after the foreground-background difference of each position point in the reconstruction space is obtained in the step 203, all position points in the reconstruction space may be filtered by using a preset foreground-background threshold. For example, in a case that the foreground-background difference of a position point in the reconstruction space is greater than or equal to the preset foreground-background threshold, it is determined that the position point belongs to the object. The position points belonging to the object can be picked from all position points in the reconstruction space, so as to reconstruct the object three-dimensionally.

Figure 4:
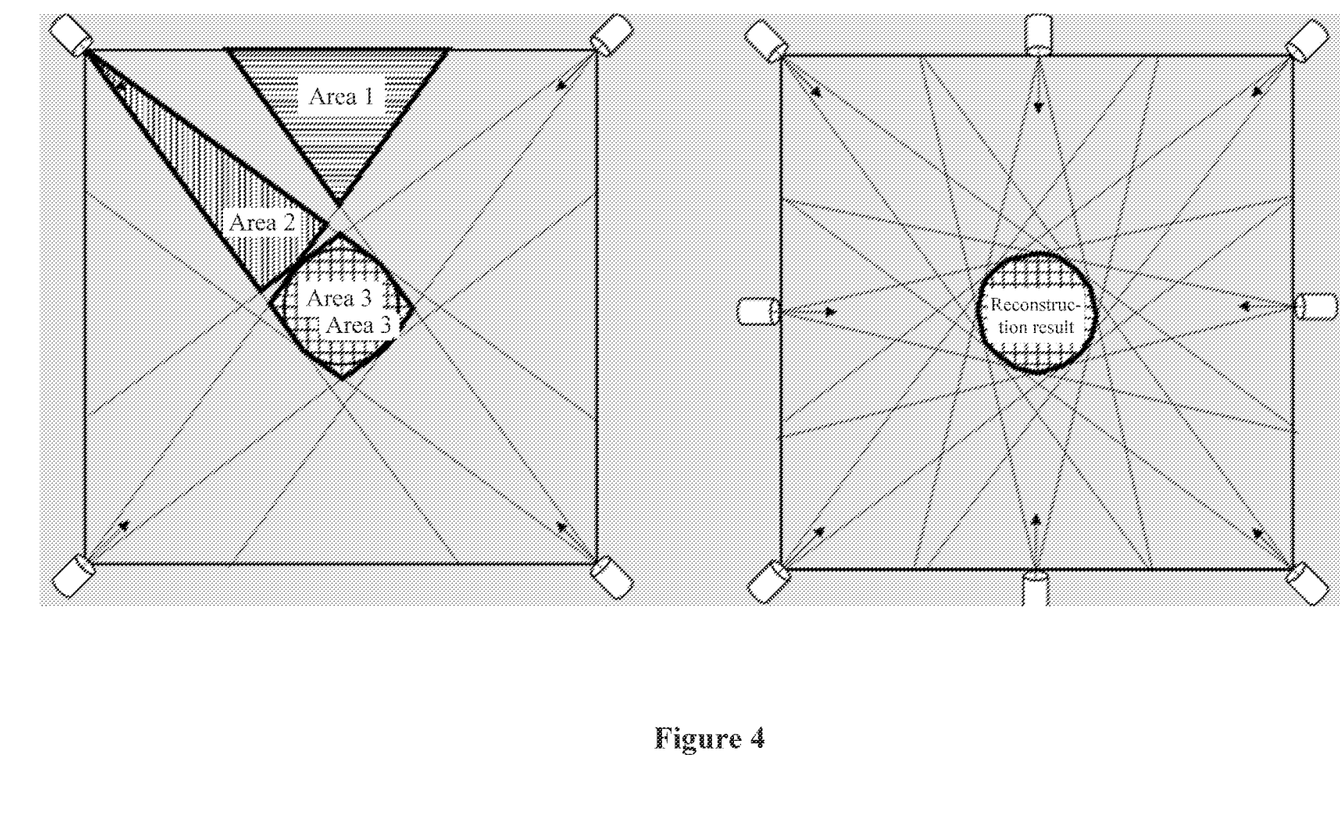
FIG. 4 is a schematic top view of a three-dimensionally reconstructed pure black cylinder in a pure white reconstruction space according to an embodiment of the present disclosure.

For example, the boundary surface of the reconstruction space is of a pure white texture, and the pixel value of each position point in the N initial background images is $(R_B, G_B,$ $B_B$)=(255,255,255). In a case that a pure black cylinder enters the reconstruction space, the pixel value of each position point in an object-part (the foreground image) in the N current images is ($R_C,G_C,B_C$)=(0,0,0), and the pixel value of each position point in the remaining part (the background image) is ($R_C,G_C,B_C$)=(255,255,255). It is assumed that the difference function F is determined based on the Euclidean distance equation. In a case that the position point in the current image belongs to the foreground image, the corresponding foreground-background difference Diff may be calculated as Diff=$\sqrt{(0-255)^2+(0-255)^2+(0-255)^2}\approx441$. In a case that the position point in the current image belongs to the background image, the corresponding foreground-background difference Diff may be calculated as Diff=$\sqrt{(255-255)^2+(255-255)^2+(255-255)^2}\approx0$. FIG. 4 shows a schematic top view of a three-dimensionally reconstructed pure black cylinder in a pure white reconstruction space. In order to facilitate description, the top view is adopted to show the three-dimensional reconstruction in a plane. As shown in the left sub-figure, the reconstruction space is a cube, and four cameras are fixedly disposed at the four vertices of the reconstruction space in the top view. The object is located in an area included between the two rays emitted from each camera, and the background is in the remaining area. Therefore, the foreground-background difference of a position point in the current image corresponding to a camera is equal to 441 in a case that the position point is located between the two rays of such camera, and is equal to 0 otherwise. Assuming the adding function serves as the fusing function R, the foreground-background difference Diff3D of each position point in the reconstruction space is Diff3D=$\sum_{i=1}^{4}$ Diff$_i$.

For each position point in area 1, Diff$_1$=0, Diff$_2$=0, Diff$_3$=0, Diff$_4$=0, and thus Diff3D=0. For each position point in area 2, Diff$_1$=441, Diff$_2$=0, Diff$_3$=0, Diff$_4$=441, and thus Diff3D=882. For each position point in area 3, Diff$_1$=441, Diff$_2$=441, Diff$_3$=441, Diff$_4$=441, and thus Diff3D=1764. The preset foreground-background threshold is equal to 1764. Hence, the Diff3D of each position point in area 1, area 2, and area 3 is compared with the preset foreground-background threshold 1764. In a case that the Diff3D of a certain position point is greater than or equal to the preset foreground-background threshold 1764, it is determined that the position point belongs to the object. Accordingly, each position point in area 3 belongs to the object, and the polygon as shown in area 3 is obtained from the three-dimensional reconstruction. Since the entering object is actually a cylinder, the top view thereof should be circular, and the reconstructed polygon indicates a certain error of the three-dimensional reconstruction. Reference is further made to the right sub-figure of FIG. 4. In a case that a quantity of the fixedly disposed cameras is increased from 4 to 8, the shape obtained from the three-dimensional reconstruction is more circular. Hence, the more cameras are arranged, the more data can be used, and the more accurate the three-dimensional reconstruction is.

Figure 5:
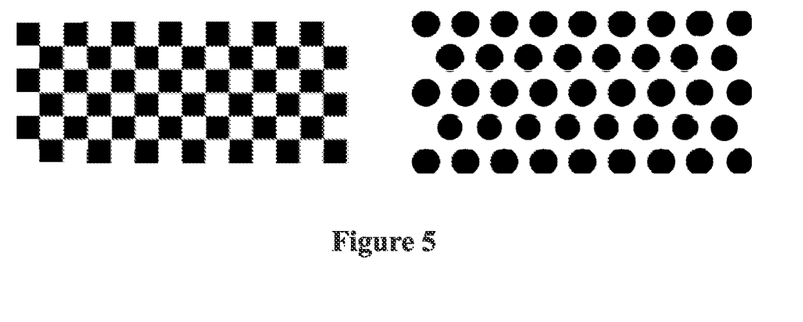
FIG. 5 is black-and-white textures according to an embodiment of the present disclosure.

In practice, a color and a texture of an outer surface of the object entering the reconstruction space is not limited. Namely, the outer surface may be of a dark texture or a light texture. Strong contrasts are achieved between objects with an outer surface of a dark texture and the initial background images with a light texture, and between objects with an outer surface of a light texture and the initial background images with a dark texture. In order to be compatible with objects with outer surfaces of both dark and light textures, the boundary surface of the reconstruction space may be provided with a dark texture and a light texture that alternate with each other. That is, the boundary surface of the reconstruction space may have a texture of alternating colors, so as to better separate the foreground from the background. In some embodiments of the present disclosure, the reconstruction space boundary has a texture of alternating colors. For example, the texture of alternating black and white as shown in FIG. 5 may be applied to the boundary surface of the reconstruction space.

In a case that illumination in the reconstruction space is stable, the initial background images previously obtained are still suitable for the reconstruction space, and may be further used without update. In a case that the illumination in the reconstruction space changes, and the initial background images previously obtained are no longer applicable to the reconstruction space after the change, the initial background images need to be updated. A principle of updating the initial background images is as follows. It is determined whether the reconstruction space is currently empty. In case of positive determination, each camera captures another image of the reconstructed space, so as to update the initial background images. Hence, in some embodiments of the present disclosure, the method may further include step E as an example. In step E, images captured by the N cameras for the reconstruction space are acquired to update the N initial background images, in response to illumination being changed when the reconstruction space is empty.

Various implementations are provided in the above embodiments. First, the images of the reconstruction space captured by the N cameras, whose fields of view cover the reconstruction space, are acquired as the N current images in response to the object entering the reconstruction space. Then, the foreground-background differences of all position points in the N current images are obtained according to the N current images and the N corresponding initial background images, which are of the reconstruction space and captured by the N cameras when the reconstruction space is empty. Afterwards, the corresponding ones of the foreground-background differences of all position points in the N current images are fused according to the corresponding relationship between all position points in the N current images and all position points in the reconstruction space, to obtain the foreground-background difference of each position point in the reconstruction space. Finally, all position points in the reconstruction space are filtered based on the foreground-background difference of each position point in the reconstruction space and the preset foreground-background threshold, to reconstruct the object three-dimensionally. Hence, in response to the object entering the reconstruction space, a foreground is separated from a background based on the N current images and the N corresponding initial background images, so as to reconstruct the object three-dimensionally. Calculations for separating the foreground from the background are simple and convenient, and thereby three-dimensional reconstruction of the object entering the reconstruction space can be implemented quickly and in real time. The method is quite suitable for scenarios that require real-time three-dimensional reconstruction.

Apparatus Embodiment

Figure 6:
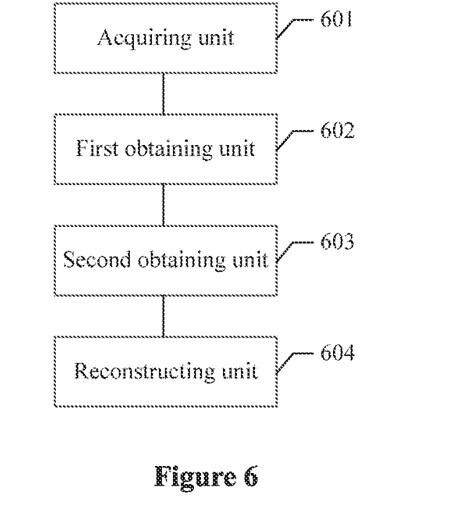
FIG. 6 is a schematic structural diagram of an apparatus for three-dimensional reconstruction according to an embodiment of the present disclosure.

Reference is made to FIG. 6, which is a schematic structural diagram of an apparatus for three-dimensional reconstruction according to an embodiment of the present disclosure. In this embodiment, the apparatus for three-dimensional reconstruction may include an acquiring unit 601, a first obtaining unit 602, a second obtaining unit 603, and a reconstructing unit 604, as an example.

The acquiring unit 601 is configured to acquire images of a reconstruction space captured by N cameras as N current images, in response to an object entering the reconstruction space. N is a positive integer greater than or equal to 2, and the reconstruction space is covered by fields of view of the N cameras.

The first obtaining unit 602 is configured to obtain foreground-background differences of all position points in the N current images, according to the N current images and N initial background images of the reconstruction space. The N initial background images correspond to the N current images, and are captured by the N cameras when the reconstruction space is empty The second obtaining unit 603 is configured to fuse corresponding ones of the foreground-background differences of all position points in the N current images, according to a corresponding relationship between all position points in the N current images and all position points in the reconstruction space, to obtain a foreground-background difference of each position point in the reconstruction space.

The reconstructing unit 604 is configured to filter all position points in the reconstruction space, based on the foreground-background difference of each position point in the reconstruction space and a preset foreground-background threshold, to reconstruct the object three-dimensionally.

In an optional embodiment, the corresponding relationship between all position points in the N current images and all position points in the reconstruction space is determined by position information of the N cameras and angle information of the N cameras. The N cameras are fixedly disposed at an edge of the reconstruction space.

In an optional embodiment, the first obtaining unit 602 includes a first obtaining subunit and a second obtaining subunit.

The first obtaining subunit is configured to obtain pixel values of all position points in the N current images and pixel values of all position points in the N initial background images.

The second obtaining subunit is configured to obtain the foreground-background differences of all position points in the N current images, according to the pixel values of all position points in the N current images, the pixel values of all position points in the corresponding N initial background images, and a difference function.

In an optional embodiment, the difference function is determined based on a Gaussian mixture model, or based on a vector distance equation.

In an optional embodiment, the vector distance equation includes a Euclidean distance equation, a Manhattan distance equation, or a cosine distance equation.

In an optional embodiment, the second obtaining unit 603 include an determining subunit and a third obtaining subunit.

The determining subunit is configured to determine foreground-background differences of position points, which correspond to each position point in the reconstruction space, in the N current images according to the corresponding relationship between all position points in the N current images and all position points in the reconstruction space.

The third obtaining subunit is configured to obtain the foreground-background difference of each position point in the reconstruction space, according to the foreground-background differences of the position points, which correspond to each position point in the reconstruction space, in the N current images and a fusing function.

In an optional embodiment, the fusing function includes an adding function or a multiplying function.

In an optional embodiment, a boundary surface of the reconstruction space has a texture of alternating colors.

In an optional embodiment, the apparatus further includes an updating unit.

The updating unit is configured to acquire images captured by the N cameras for the reconstruction space to update the N initial background images, in response to illumination being changed when the reconstruction space is empty.

Various implementations are provided in the above embodiments. First, the images of the reconstruction space captured by the N cameras, whose fields of view cover the reconstruction space, are acquired as the N current images in response to the object entering the reconstruction space. Then, the foreground-background differences of all position points in the N current images are obtained according to the N current images and the N corresponding initial background images, which are of the reconstruction space and captured by the N cameras when the reconstruction space is empty. Afterwards, the corresponding ones of the foreground-background differences of all position points in the N current images are fused according to the corresponding relationship between all position points in the N current images and all position points in the reconstruction space, to obtain the foreground-background difference of each position point in the reconstruction space. Finally, all position points in the reconstruction space are filtered based on the foreground-background difference of each position point in the reconstruction space and the preset foreground-background threshold, to reconstruct the object three-dimensionally. Hence, in response to the object entering the reconstruction space, a foreground is separated from a background based on the N current images and the N corresponding initial background images, so as to reconstruct the object three-dimensionally. Calculations for separating the foreground from the background are simple and convenient, and thereby three-dimensional reconstruction of the object entering the reconstruction space can be implemented quickly and in real time. The apparatus is quite suitable for scenarios that require real-time three-dimensional reconstruction.

A terminal device is further provided according to embodiments of the present disclosure. The terminal device includes a processor and a memory.

The memory is configured to store program codes and transmit the program codes to the processor.

The processor is configured to execute any method for three-dimensional reconstruction in the foregoing method embodiments, according to instructions in the program codes.

A computer-readable storage medium is further provided according to embodiments of the present disclosure. The computer-readable storage medium is configured to store program codes. The program codes are configured to execute any method for three-dimensional reconstruction in the foregoing method embodiments.

The embodiments of the present disclosure are described in a progressive manner, and each embodiment places emphasis on the difference from other embodiments. Therefore, one embodiment can refer to other embodiments for the same or similar parts. Since the apparatuses disclosed in the embodiments correspond to the methods disclosed in the embodiments, the description of the apparatuses is simple, and reference may be made to the relevant part of the methods.

As further be appreciated by those skilled in the art, the units and algorithmic steps in the examples described according to the embodiments disclosed herein can be implemented in forms of electronic hardware, computer software or the combination of the both. To illustrate the interchangeability of the hardware and the software clearly, the components and the steps in the examples are described generally according to functions in the above description. Whether hardware or software is used to implement the functions depends on a specific application and design constraints for the technical solution. For each specific application, different methods may be used by those skilled in the art to implement the described function, and such implementation should not be considered to depart from the scope of this invention.

It should be noted that, the relationship terms such as "first", "second" and the like are only used herein to distinguish one entity or operation from another, rather than to necessitate or imply that an actual relationship or order exists between the entities or operations. Furthermore, the terms such as "include", "comprise" or any other variants thereof means to be non-exclusive. Therefore, a process, a method, an article or a device including a series of elements include not only the disclosed elements but also other elements that are not clearly enumerated, or further include inherent elements of the process, the method, the article or the device. Unless expressively limited, the statement "including a . . . " does not exclude the case that other similar elements may exist in the process, the method, the article or the device other than enumerated elements.

The foregoing embodiments are only preferred embodiments of the present disclosure, and do not limit the present disclosure in any form. The preferred embodiments according to the disclosure are disclosed above, and are not intended to limit the present disclosure. With the method and technical content disclosed above, those skilled in the art can make some variations and improvements to the technical solutions of the present disclosure, or make some equivalent variations on the embodiments without departing from the scope of technical solutions of the present disclosure. All simple modifications, equivalent variations and improvements made based on the technical essence of the present disclosure without departing the content of the technical solutions of the present disclosure fall within the protection scope of the technical solutions of the present disclosure.

The invention claimed is:

1. A method for three-dimensional reconstruction, comprising:
    acquiring images of a reconstruction space captured by N cameras as N current images, in response to an object entering the reconstruction space, wherein N is a positive integer greater than or equal to 2, and the reconstruction space is covered by fields of view of the N cameras;
    obtaining first foreground-background differences of all position points in the N current images, according to the N current images and N initial background images of the reconstruction space, wherein the N initial background images correspond to the N current images, and are captured by the N cameras when the reconstruction space is empty;
    obtaining a second foreground-background difference of each position point in the reconstruction space based on the first foreground-background differences of target position points corresponding to the first position point, wherein the target position points are in the N current images, respectively, and the second foreground-background difference is positively correlated with the first foreground-background difference of each of the target position points, and
    filtering all position points in the reconstruction space, based on the second foreground-background difference of each position point in the reconstruction space and a preset foreground-background threshold, to reconstruct the object three-dimensionally.

2. The method according to claim 1, wherein the corresponding relationship between all position points in the N current images and all position points in the reconstruction space is determined by position information of the N cameras and angle information of the N cameras, and the N cameras are fixedly disposed at an edge of the reconstruction space.

3. The method according to claim 1, wherein obtaining the first foreground-background differences of all position points in the N current images, according to the N current images and the N initial background images, comprises:
    obtaining pixel values of all position points in the N current images and pixel values of all position points in the N initial background images, and
    obtaining the first foreground-background differences of all position points in the N current images, according to the pixel values of all position points in the N current images, the pixel values of all position points in the corresponding N initial background images, and a difference function.

4. The method according to claim 3, wherein the difference function is determined based on a Gaussian mixture model, or based on a vector distance equation.

5. The method according to claim 4, wherein the vector distance equation comprises a Euclidean distance equation, a Manhattan distance equation, or a cosine distance equation.

6. The method according to claim 1, wherein obtaining the second foreground-background difference of each position point in the reconstruction space based on the first foreground-background differences of the target position points, comprises:
    determining the first foreground-background differences of position points, which correspond to each position point in the reconstruction space, in the N current images according to the corresponding relationship between all position points in the N current images and all position points in the reconstruction space; and
    obtaining the second foreground-background difference of each position point in the reconstruction space, according to the first foreground-background differences of the position points, which correspond to each position point in the reconstruction space, in the N current images through a fusing function.

7. The method according to claim 6, wherein the fusing function comprises an adding function or a multiplying function.

8. The method according to claim 1, wherein a boundary surface of the reconstruction space has a texture of alternating colors.

9. The method according to claim 1, further comprising:
    acquiring images captured by the N cameras for the reconstruction space to update the N initial background images, in response to illumination being changed when the reconstruction space is empty.

10. A terminal device, comprising:
    a memory, configured to store program codes and transmit the program codes to the processor, and a processor, configured to execute according to instructions in the program codes the method according to claim 1.

11. A non-transitory computer-readable storage medium, configured to store program codes, wherein:
the program codes are configured to execute the method according to claim 1.

12. The method according to claim 1, wherein each position point in each of the N current images is a pixel point, and each position point in the reconstruction space is a voxel point.

13. The method according to claim 1, wherein the larger the second foreground-background difference for each position point in the reconstruction space is, the higher a probability of said position point belonging to the object is.

* * * * *